US008288506B2

(12) United States Patent
Kim et al.

(10) Patent No.: US 8,288,506 B2
(45) Date of Patent: Oct. 16, 2012

(54) CONDUCTIVE MATERIAL AND MANUFACTURING METHOD THEREOF

(75) Inventors: Jeong Han Kim, Seongnam-si (KR); Ji Sung Kim, Seoul (KR); Ki Nam Kwak, Yongin-si (KR); Sang Min Song, Busan (KR); Chung Seock Kang, Yongin-si (KR)

(73) Assignee: Kolon Industries, Inc., Gwacheon-si, Gyeonggi-do (KR)

( * ) Notice: Subject to any disclaimer, the term of this patent is extended or adjusted under 35 U.S.C. 154(b) by 200 days.

(21) Appl. No.: 12/747,804

(22) PCT Filed: Dec. 12, 2008

(86) PCT No.: PCT/KR2008/007355

§ 371 (c)(1),
(2), (4) Date: Aug. 10, 2010

(87) PCT Pub. No.: WO2009/078621

PCT Pub. Date: Jun. 25, 2009

(65) Prior Publication Data

US 2010/0305298 A1 Dec. 2, 2010

(30) Foreign Application Priority Data

Dec. 14, 2007 (KR) ........................ 10-2007-0131064

(51) Int. Cl.

| | |
|---|---|
| ***C08G 69/26*** | (2006.01) |
| ***C08J 3/02*** | (2006.01) |
| *C08G 69/00* | (2006.01) |
| *C08J 3/00* | (2006.01) |

(52) U.S. Cl. ........ 528/332; 528/492; 528/493; 528/494; 528/495; 528/496; 528/497; 528/499; 528/503; 524/501; 524/522

(58) Field of Classification Search .................. 528/332, 528/492, 493, 494, 495, 496, 497, 499, 503; 524/501, 522

See application file for complete search history.

(56) References Cited

FOREIGN PATENT DOCUMENTS

| | | |
|---|---|---|
| JP | 2005-162814 | * 6/2005 |
| KR | 10-0685796 | * 2/2007 |
| KR | 10-0759754 | * 10/2007 |

OTHER PUBLICATIONS

Ramanathan et al; Amino-functionalized carbon nanotubes for binding to polymers and biological systems, 2005, Chem. Matter, vol. 17, pp. 1290-1295, See Figure 1 and experimental Section.*

Gao, Junbo et al; Continuous spinning of a single walled carbon nanotube-nylon composite fiber, 2005, J. Am. Chem. Soc., vol. 127, pp. 3847-3854, see Experimental Section.*

* cited by examiner

*Primary Examiner* — Duc Truong
(74) *Attorney, Agent, or Firm* — Sughrue Mion, PLLC

(57) ABSTRACT

Disclosed is a method of manufacturing a conductive coating film having superior chemical resistance or solvent resistance and durability by chemically bonding a resin having an amine group (—$NH_2$) with carbon nanotubes having a carboxyl group (—COOH). The conductive material having high bondability with carbon nanotubes and superior electrical properties includes carbon nanotubes uniformly contained therein, and thus has appropriate surface resistivity, and thereby can be used for antistatic, electrostatic dissipation and electromagnetic shielding purposes and in transparent or opaque electrodes depending on the resistivity value.

11 Claims, No Drawings

CONDUCTIVE MATERIAL AND MANUFACTURING METHOD THEREOF

TECHNICAL FIELD

The present invention relates to a conductive material and a manufacturing method thereof, and particularly, to a conductive material including carbon nanotubes and a method of manufacturing the same.

BACKGROUND ART

Since carbon nanotubes (CNTs) were first discovered by Iijima [S. Iijima, Nature Vol. 354, P. 56 (1991)], thorough research therein has been being conducted. CNTs have potential properties which are not found in conventional materials, including the high elastic modulus of about 1.0~1.8 TPa, heat resistance capable of enduring heat at about 2800° C. in a vacuum, high thermal conductivity about two times that of diamond and high current mobility about 1000 times that of copper. Thus, CNTs are considered to be highly applicable in the entire field including nano-sized electrical devices, electronic devices, nano-sensors, optoelectronic devices, high functional composites and so on.

However, CNTs are problematic in that they are very difficult to disperse in a polymer resin owing to the long cylindrical shape thereof. Accordingly, a dispersant may be used, but the dispersion of CNTs is still difficult despite the use of a dispersant.

In conventional photoelectrochemical devices including CNTs, CNTs are used in a manner such that CNTs are layered on a polymer resin substrate using physical vapor deposition (PVD) including sputtering, ion plating or vacuum evaporation or chemical vapor deposition (CVD). However, this manner may cause problems including the use of a complicated apparatus, poor productivity, and difficulty of continuously applying CNTs on a large substrate.

With the goal of solving the aforementioned problems, a method of manufacturing a coating film containing CNTs has been developed (Japanese Patent No. 3665969), the method including applying a first dispersion containing CNTs dispersed therein on a substrate, removing the solvent, and applying a second dispersion containing a polymer resin and a solvent so that the second dispersion infiltrates a three-dimensional network structure of CNTs, thus manufacturing the coating film containing CNTs. However, this method is very disadvantageous because CNTS are easily separated upon treatment with a chemical or a solvent for application to electronic devices, electrical devices, etc.

Also, a method of manufacturing a conductive film through chemical bonding between CNTs having —COOH and a surface of a polymer resin film having —NH has been developed (Korean Patent Application No. 10-2006-0032812). In this case, however, the CNTs exposed to the surface of the film easily separate therefrom due to a mechanical force such as a surface frictional force occurring in the process, negatively affecting electrical properties (surface resistivity) of the conductive film.

DISCLOSURE

Technical Problem

Accordingly, the present invention provides a conductive material, which includes a polymer resin and CNTs which are easily chemically bonded thereto so that CNTs are not exposed to the surface of the polymer resin, thus preventing the separation of the CNTs upon surface friction, the conductive material exhibiting superior chemical resistance to hence maintain conductivity even in changing environmental conditions, and also provides a manufacturing method thereof.

In addition, the present invention provides a conductive material having superior electrical properties, which includes CNTs uniformly contained therein and has appropriate surface resistivity, and thus may be used for antistatic and electrostatic purposes and in transparent or opaque electrodes depending on the resistivity value, and also provides a manufacturing method thereof.

Technical Solution

According to a preferred embodiment of the present invention, a conductive material includes a polymer resin having an amine group ($—NH_2$) and CNTs having a carboxyl group (—COOH) chemically bonded thereto and having a peel index of 30% or less, as represented by Equation 1 below.

$$\text{Peel Index (\%)} = \frac{R_0 - R_1}{R_0} \times 100 \qquad \text{Equation 1}$$

wherein $R_0$ is surface resistivity of a conductive material not treated, and $R_1$ is surface resistivity of a surface of the conductive material from which a tape is peeled off after having been adhered to the surface of the conductive material for 10 min.

The conductive material according to the embodiment of the present invention may have a chemical resistance index of 10% or less, as represented by Equation 2 below.

$$\text{Chemical Resistance Index (\%)} = \frac{R_0 - R_2}{R_0} \times 100 \qquad \text{Equation 2}$$

wherein $R_0$ is surface resistivity of the conductive material not treated, and $R_2$ is surface resistivity of the conductive material after treatment including immersion in ethanol for 1 hour, removal from ethanol, washing with ethanol and then drying.

In the conductive material according to the embodiment of the present invention, the CNTs having a carboxyl group (—COOH) may be used in an amount of 0.001~2 wt % based on the solid content of the polymer resin.

The conductive material according to the embodiment of the present invention may have the surface resistivity of $10^{-2}$~$10^{11}$ Ω/□.

Also, according to another preferred embodiment of the present invention, a method of manufacturing a conductive material includes applying a first dispersion including a first solvent and CNTs having a carboxyl group (—COOH) on a substrate layer; removing the solvent from the applied first dispersion, thus forming a network layer of CNTs having a carboxyl group (—COOH); applying a second dispersion including the first solvent and a resin having an amine group ($—NH_2$) on the network layer of CNTs having a carboxyl group (—COOH), so that the second dispersion infiltrates the network layer of CNTs having a carboxyl group (—COOH); peeling off the substrate layer; and forming an amide bond between the resin having an amine group ($—NH_2$) and the CNTs having a carboxyl group (—COOH).

In the method, forming the amide bond between the resin having an amine group ($—NH_2$) and the CNTs having a carboxyl group (—COOH) may be performed by immersing a coating film obtained by peeling off the substrate layer in a coupling solution including a second solvent and an amide coupling agent.

In the method, forming the amide bond between the resin having an amine group (—$NH_2$) and the CNTs having a carboxyl group (—COOH) may be performed through heating in a temperature range of 40~400° C. at a heating rate of 1~10° C./min for 0.5 hours or longer.

In the method, the first solvent may be one or a mixture of two or more selected from among alcohols, water, acetones, ethers, and toluenes.

In the method, the CNTs having a carboxyl group (—COOH) may be prepared through acid treatment.

In the method, the second solvent may be one or a mixture of two or more selected from among N-methyl-2-pyrrolidone (NMP), dimethylacetamide (DMAc), dimethylformamide (DMF), cyclohexanone, ethanol, methanol and chlorobenzene.

In the method, the amide coupling agent may be a mixture of one or more selected from among 1,3-dicyclohexylcarbodiimide (DCC), 1-ethyl-3-(3-dimethylaminopropyl)carbodiimide.HCl and di-n-hexylcarbodiimide, and 1-hydroxybenzotriazole (HOBt).

Advantageous Effects

According to the present invention, the conductive material containing CNTs which do not easily separate therefrom can exhibit superior chemical resistance or solvent resistance.

Also, according to the present invention, the method of manufacturing a conductive material facilitates the preparation of a polyimide film having high bondability with CNTs.

In addition, according to the present invention, the conductive material having appropriate surface resistivity can exhibit superior electrical properties.

Also, in the method of manufacturing a conductive material according to the present invention, CNTs can be uniformly contained in the conductive material at an intended level, and thus the conductive material can have superior electrical properties.

BEST MODE

Hereinafter, a detailed description will be given of the present invention.

According to the present invention, a conductive material includes a resin having an amine group (—$NH_2$) and CNTs having a carboxyl group (—COOH) chemically bonded thereto so that CNTs are not exposed to the surface of the polymer resin but are located therein, thus ensuring stability under process conditions such as friction and resistance to a chemical such as a solvent.

The conductive material according to the present invention has a peel index of 30% or less as represented by Equation 1 below.

$$\text{Peel Index (\%)} = \frac{R_0 - R_1}{R_0} \times 100 \qquad \text{Equation 1}$$

wherein $R_0$ is the surface resistivity of a conductive material not treated, and $R_1$ is the surface resistivity of a surface of the conductive material from which a tape is peeled off after having been adhered to the surface of the conductive material for 10 min.

Also, the conductive material according to the present invention has a chemical resistance index of 10% or less as represented by Equation 2 below.

$$\text{Chemical Resistance Index (\%)} = \frac{R_0 - R_2}{R_0} \times 100 \qquad \text{Equation 2}$$

wherein $R_0$ is the surface resistivity of the conductive material not treated, and $R_2$ is the surface resistivity of the conductive material after treatment including immersion in ethanol for 1 hour, removal from ethanol, washing with ethanol and then drying.

The conductive material satisfying the above peel index and the above chemical resistance index can prevent the separation of CNTs due to external stimulation to hence ensure appropriate surface resistivity, and thus the conductivity thereof is uniform.

The resin having an amine group (—$NH_2$) is not particularly limited as long as an amine group (—$NH_2$) is present in a polymer resin, and, for example, may be prepared so that an amine group (—$NH_2$) is present in a polymer resin such as a polyimide resin and a polyamide resin. Although the preparation method thereof is not particularly limited, for example, when polyamic acid polymerized from diamine and dianhydride in the presence of a solvent is imidized, imidization conditions including a temperature may be changed and adjusted so that an amine group (—$NH_2$) remains in polyimide. In this case, imidization may be performed through application of heat at 80~400° C. for 1~17 hours.

For reference, a polyimide resin, which is insoluble, infusible and resistant to very high heat, has superior properties, including thermal oxidation resistance, heat resistance, radiation resistance, low temperature resistance and chemical resistance, and is thus used in various fields, including advanced heat-resistant materials, such as automobile materials, aircraft materials, spacecraft materials and so on, and electronic materials, such as insulation coating agents, insulating films, semiconductors, electrode protective films of TFT-LCDs and so on. Also, the polyimide film according to the present invention has superior electrical properties and thus may be utilized for transparent electrodes and antistatic agents.

The conductive material according to the present invention may have the surface resistivity of $10^{-2}$~$10^{11}$Ω/□.

To this end, the conductive material according to the present invention includes CNTs having a carboxyl group (—COOH) in an amount of 0.001~2 wt % based on the solid content of the polymer resin.

In order to prepare the conductive material according to the present invention, the resin having an amine group may be prepared so that the amine group is uniformly distributed therein, and the amount thereof may be adjusted, thus controlling the degree of distribution of CNTs having a carboxyl group to be chemically bonded thereto and the amount thereof. Accordingly, the surface resistivity may be controlled to be entirely uniform.

The CNTs used in the present invention are not particularly limited, and commercially available products or CNTs prepared through a typical process may be used. As such, because the carboxyl group (—COOH) should be exposed to the surface or end of CNTs, high-purity CNTs are required.

As CNTs having a carboxyl group (—COOH) to the surface or end thereof, commercially available products may be used, or CNTs may be used after treatment including heat treatment at a high temperature (about 370° C.) for 1 hour, purification in hydrochloric acid using a sonicator for 3 hours, stirring in a mixture of sulfuric acid and hydrogen peroxide (volume ratio 2~5:1) for 20~30 hours, dilution with distilled water, filtration of a CNT suspension using a 0.1~0.5 μm filter and then drying, but the present invention is not limited thereto.

The dianhydride for the preparation of the polyimide resin which is the resin having an amine group is not particularly limited, but may include one or more selected from among 2,2-bis(3,4-dicarboxyphenyl)hexafluoropropane dianhydride (FDA), 4-(2,5-dioxotetrahydrofuran-3-yl)-1,2,3,4-tetrahydronaphthalene-1,2-dicarboxylic anhydride (TDA), 4,4'-(4,4'-isopropylidenediphenoxy)bis(phthalic anhydride) (HBDA), 3,3'-(4,4'-oxydiphthalic dianhydride) (ODPA) and 3,4,3',4'-biphenyltetracarboxylic dianhydride (BPDA).

Also, the diamine for the preparation of the polyimide resin which is the resin having an amine group is not particularly limited, but may include one or more selected from among 2,2-bis[4-(4-aminophenoxy)-phenyl]propane (6HMDA), 2,2'-bis(trifluoromethyl)-4,4'-diaminobiphenyl (2,2'-TFDB), 3,3'-bis(trifluoromethyl)-4,4'-diaminobiphenyl (3,3'-TFDB), 4,4'-bis(3-aminophenoxy)diphenylsulfone (DBSDA), bis(3-aminophenyl)sulfone (3DDS), bis(4-aminophenyl)sulfone (4DDS), 1,3-bis(3-aminophenoxy)benzene (APB-133), 1,4-bis(4-aminophenoxy)benzene (APB-134), 2,2'-bis[3(3-aminophenoxy)phenyl]hexafluoropropane (3-BDAF), 2,2'-bis[4(4-aminophenoxy)phenyl]hexafluoropropane (4-BDAF) and oxydianiline (ODA).

The dianhydride component and the diamine component are dissolved in equimolar proportions in an organic solvent and are then allowed to react, thus preparing a polyamic acid solution.

The solvent for solution polymerization of the above monomers is not particularly limited, as long as polyamic acid can be dissolved therein. As the known reaction solvent, useful are one or more polar solvents selected from among m-cresol, N-methyl-2-pyrrolidone (NMP), dimethylformamide (DMF), dimethylacetamide (DMAc), dimethylsulfoxide (DMSO), acetone, and diethylacetate. In addition, a low-boiling-point solvent, such as tetrahydrofuran (THF) or chloroform, or a low-absorbing-solvent, such as γ-butyrolactone, may be used.

The amount of the reaction solvent is not particularly limited, but is set to 50~95 wt %, and preferably 70~90 wt %, based on the total amount of the polyamic acid solution, in order to prepare a polyamic acid solution having adequate molecular weight and viscosity. The method of preparing the polyimide film from the polyamic acid solution includes any conventionally known method, namely, casting the polyamic acid solution on a support and then performing imidization, thus obtaining a desired film.

The imidization method includes, for example, thermal imidization, chemical imidization, or a combination of thermal imidization and chemical imidization. Chemical imidization includes the addition of the polyamic acid solution with a dehydrating agent including acid anhydride such as acetic anhydride and an imidization catalyst including a tertiary amine such as isoquinoline, β-picoline or pyridine. In the case where thermal imidization or a combination of thermal imidization and chemical imidization is used, conditions for heating the polyamic acid solution may vary depending on the type of polyamic acid solution and the thickness of the resulting polyimide film.

When more specifically describing the preparation of the polyimide film using a combination of thermal imidization and chemical imidization, the polyamic acid solution is added with a dehydrating agent and an imidization catalyst, cast on a support and then heated at 80~200° C. and preferably 100~180° C. to thus activate the dehydrating agent and the imidization catalyst, thereby obtaining a partially cured or dried polyamic acid film in a gel state, which is then peeled off from the support. Subsequently, this gel film is heated at 200~400° C. for 5~400 sec, resulting in a polyimide film.

In addition, in the present invention, the polyimide film may be prepared from the polyamic acid solution, as described below. Specifically, the obtained polyamic acid solution is imidized, after which the imidized solution is added to one or more solvents selected from among water, alcohols, ethers and ketones, filtered and then dried, thus obtaining a solid polyimide resin. Subsequently, the solid polyimide resin is dissolved in the same solvent as the solvent used for polymerization of a polyamic acid solution, thus obtaining a polyimide solution, which is then subjected to a film forming process, resulting in a polyimide film. When the polyamic acid solution is imidized, thermal imidization, chemical imidization, or a combination of thermal imidization and chemical imidization as above may be applied. In the case of using a combination of thermal imidization and chemical imidization, the imidization may be specifically executed by adding the polyamic acid solution with a dehydrating agent and an imidization catalyst and then performing heating at 20~180° C. for 1~12 hours. As such, the amount of one or more solvents selected from among water, alcohols, ethers and ketones is not particularly limited, but is preferably 5~20 times the weight of the prepared polyamic acid solution. The conditions for drying the filtered solid polyimide resin include a temperature of 50~150° C. and a period of time of 2~24 hours, in consideration of the type of one or more solvents selected from among water, alcohols, ethers and ketones and the boiling point of the reaction solvent which may remain in the solid resin.

According to the present invention, the method of preparing the conductive material includes applying a first dispersion including a first solvent and CNTs having a carboxyl group (—COOH) on a substrate layer, removing the solvent from the first dispersion thus forming a network layer of CNTs having a carboxyl group (—COOH), applying a second dispersion including the first solvent and a resin having an amine group (—$NH_2$) on the network layer of CNTs having a carboxyl group (—COOH) so that the second dispersion infiltrates the network layer of CNTs having a carboxyl group (—COOH), peeling off the substrate layer, and forming an amide bond between the resin having an amine group (—$NH_2$) and the CNTs having a carboxyl group (—COOH).

The substrate layer is not particularly limited, and may be made of any material such as metal, polymer resin, glass, etc.

The first dispersion including the first solvent and the CNTs having a carboxyl group (—COOH) is applied on one surface of the substrate layer. The first solvent may be one or a mixture of two or more selected from among alcohols, water, acetones, ethers and toluenes. The CNTs having a carboxyl group (—COOH) may have a carboxyl group through surface modification as mentioned above.

The first dispersion is preferably applied to a thickness of 1~1000 nm, in terms of transparency of the conductive polymer film. In the application field requiring no transparency, the thickness is not limited.

The applied first dispersion is treated in the air, a nitrogen atmosphere or a reduced pressure state, thus removing the solvent, thereby forming the three-dimensional network layer of CNTs having a carboxyl group (—COOH).

Then, the second dispersion including the polymer resin having an amine group (—$NH_2$) and the first solvent is applied thereon, so that the second dispersion infiltrates the network layer of CNTs having a carboxyl group (—COOH). The second dispersion is preferably applied to a thickness of 0.5~500 μm including the network layer of CNTs having a carboxyl group, in terms of transparency. In the application field requiring no transparency, the second dispersion may be applied to be thicker than the first dispersion.

Then, the substrate layer is peeled off, thus exposing the CNTs having a carboxyl group (—COOH) to the peeled-off surface.

At this time, because the amide bond is not yet formed between the resin having an amine group (—$NH_2$) and the CNTs having a carboxyl group (—COOH), the formation of the amide bond should be additionally performed.

The formation of the amide bond is not particularly limited, but includes immersion of a coating film obtained by peeling off the substrate layer in a coupling solution including the second solvent and an amide coupling agent, heating, or dewatering, thereby forming the amide bond. The heating may be performed at 40~400° C. at a heating rate of 1~10° C./min for 0.5 hours or longer. Alternatively, immersion in a coupling solution, washing and then drying or heating as above may be performed.

The second solvent may be one or a mixture of two or more selected from among water, N-methyl-2-pyrrolidone (NMP), dimethylacetamide (DMAc), dimethylformamide (DMF), cyclohexanone, ethanol, methanol and chlorobenzene. The amide coupling agent may be a mixture of one or more selected from among carbodiimide derivatives including 1,3-dicyclohexylcarbodiimide (DCC), 1-ethyl-3-(3-dimethylaminopropyl)carbodiimide.HCl and di-n-hexylcarbodiimide, and 1-hydroxybenzotriazole (HOBt).

In order to facilitate the formation of the amide bond at room temperature, it is preferred that the coating film having the CNTs having a carboxyl group exposed by peeling off the substrate layer be immersed in the second solvent.

Through these procedures, the CNTs are inserted into the resin and also have high bondability thereto thanks to the amide bond, and thus are not easily separated upon treatment with a chemical or a solvent for application to electronic devices, electrical devices, etc.

A better understanding of the present invention may be obtained through the following examples, which are set forth to illustrate, but are not to be construed as limiting the present invention.

Example 1

1. Preparation of CNTs having Exposed Carboxyl group: 1.0 g of CNTs was added to 1 l of hydrochloric acid, purified using a sonicator for 3 hours, and filtered using a 1 μm filter. These procedures were repeated three times, thus purifying CNTs. The CNTs thus purified were stirred in a mixture of hydrochloric acid and hydrogen peroxide (volume ratio 4:1) for 24 hours, and then diluted with distilled water. The suspension of CNTs thus obtained was filtered using a 0.2 μm filter and then dried.

2. Preparation of Polyimide Solution (Second Dispersion) having Amine End Group: while nitrogen was passed through a 100 ml 3-Neck round-bottom flask used as a reactor and equipped with a stirrer, a nitrogen inlet, a dropping funnel, a temperature controller and a condenser, 31.82 g of N,N-dimethylacetamide (DMAc) was added thereto The temperature of the reactor was decreased to 0° C., 3.2023 g (0.01 mol) of 2,2'-TFDB was dissolved therein, and then the resulting solution was maintained at 0° C. Then, 4.164 g (0.008 mol) of 6HBDA was added thereto and then stirred for 1 hour to thus completely dissolve 6HBDA, after which 0.58844 g (0.002 mol) of BPDA was added and thus completely dissolved. The solid content was thus 20 wt %. Subsequently, the solution was allowed to stand at room temperature and stirred for 8 hours, thereby obtaining a polyamic acid solution having a viscosity of 1900 poise at 23° C.

To the polyamic acid solution was added a chemical curing agent for example 2~4 equivalents of each of acetic anhydride (acetic oxide, available from SamChun) and pyridine (available from SamChun), after which the polyamic acid solution was heated in the temperature range of 20~180° C. at a heating rate of 1~10° C./min for 2~10 hours, thus imidizing the polyamic acid solution. Then, 30 g of the imidized solution was added to 300 g of water, after which the precipitated solid was filtered and milled, thus obtaining fine powder, which was then dried in a vacuum oven at 80~100° C. for 2~6 hours, giving about 8 g of solid resin powder. The solid resin powder was dissolved in 32 g of DMAc as a polymerization solvent, thus obtaining a polyimide solution having a solid content of 20 wt %.

3. Preparation of Coupling Solution: As an amide coupling agent, DCC (1,3-dicyclohexyl-carbodiimide) and HOBt (1-hydroxybezotriazole) were respectively dissolved to 12 mM in ethanol, thus preparing a dispersion solution.

4. Preparation of CNT Film: 0.002 wt % of the CNTs having the exposed carboxyl group prepared in step 1 was added to ethanol, and then dispersed using a sonicator for 10 hours, thus preparing a first dispersion. The first dispersion was uniformly applied to a thickness of 1 μm on a substrate layer (glass) using an applicator, and then the solvent was removed under reduced pressure, thus forming a network layer of CNTs. Then, the polyimide solution prepared in step 2, namely, the second dispersion was applied on the network layer of CNTs on the substrate layer to a thickness of 300 μm including the network layer, and then heated in the temperature range of 20~250° C. at a heating rate of 1~10° C./min for 1~2 hours to thus remove the solvent, after which the substrate layer was peeled off.

5. Chemical Bonding between the Amide (—NH) of Polyimide and the Carboxyl group (—COOH) of CNTs: The CNT film prepared in step 4 was allowed to react for 1 hour in the coupling solution prepared in step 3, washed with ethanol, and then dried, thereby obtaining a polyimide film.

Example 2

A polyimide film was obtained in the same manner as in Example 1, with the exception that, in step 5, the CNT film prepared in step 4 was heated in the temperature range of 40~400° C. at a heating rate of 1~10° C./min for 8 hours.

Example 3

In step 2 of Example 1, 3.2023 g (0.01 mol) of 2,2'-TFDB was dissolved in 33.59 g of DMAc, and the resulting solution was maintained at 0° C. Then, 3.64355 g (0.007 mol) of 6HBDA and 1.551 g (0.003 mol) of ODPA were sequentially added thereto and then stirred for 1 hour, thus completely dissolving 6HBDA and ODPA. The solid content was thus 20 wt %. The resulting solution was allowed to stand at room temperature and stirred for 8 hours. Thus, the same subsequent procedures were performed with the exception that a polyamic acid solution having a viscosity of 1800 poise at 23° C. was prepared, thereby obtaining a polyimide film.

Example 4

A polyimide film was obtained in the same manner as in Example 1, with the exception that 0.2 wt % of the CNTs having the exposed carboxyl group was dispersed in ethanol in step 4 of Example 1.

Comparative Example 1

A polyimide film was obtained in the same manner as in Example 1, with the exception that step 5 was not performed.

Comparative Example 2

Preparation of Dispersion Solution of CNTs: 0.1 wt % of the CNTs having the exposed carboxyl group prepared in step 1 of Example 1 was added to ethanol, and then dispersed using a sonicator for 10 hours. As an amide coupling agent, DCC (1,3-dicyclohexylcarbodiimide) and HOBt (1-hydroxybenzotriazole) were respectively dissolved to 12 mM therein.

Preparation of Polyimide Film: The Polyimide Solution prepared in step 2 of Example 1 was uniformly applied to a thickness of 1 μm on the substrate layer using an applicator, the solvent was removed under reduced pressure, and then the substrate layer was peeled off.

Preparation of CNt Film: The Polyimide Film was allowed to react for 10 hours in the dispersion solution of CNTs, washed with ethanol, and then dried under reduced pressure.

The properties of the polyimide film of each of the examples and comparative examples were evaluated through the following methods. The results are shown in Table 1 below.

(1) Surface Resistivity ($R_0$)

High resistivity ($10^7\Omega/\square$ or more) was measured by continuously applying a voltage to the CNT film of Examples 1-4 and Comparative Examples 1 and 2 using a resistivity meter available from Mitsubishi Chemical. While the voltage was changed to 10 V, 100 V, 250 V, 500 V and 1000 V, measuring was performed. Also, for the measurement of resistivity, a sample was mounted on a metal substrate, and the resistivity thereof was measured at intervals of 10~30 sec. As such, a ring probe was used.

Low resistivity ($10^7\Omega/\square$ or less) was determined by measuring the surface resistivity of the CNT film of Examples 1~4 and Comparative Examples 1 and 2 under conditions of 25° C. and 30% RH using a 4-point probe system available from Advanced Instrument Technology.

(2) Peel Test

After the surface resistivity ($R_0$) of the CNT film of Examples 1~4 and Comparative Examples 1 and 2 was measured, a 3M Scotch Magic™ Tape 810 having a length of 5 cm was adhered to the same CNT film. After 10 min, the tape was peeled off from the surface of the film. The surface resistivity ($R_1$) of the surface of the film from which the tape was peeled off was measured, and thus the peel index was determined using Equation 1 below.

$$\text{Peel Index (\%)} = \frac{R_0 - R_1}{R_0} \times 100 \quad \text{Equation 1}$$

wherein $R_0$ is the surface resistivity of a conductive material not treated, and $R_1$ is the surface resistivity of a surface of the conductive material from which a tape is peeled off after having been adhered to the surface of the conductive material for 10 min.

(3) Chemical Resistance Test

After the surface resistivity ($R_0$) of the CNT film of Examples 1~4 and Comparative Examples 1 and 2 was measured, the film was immersed in general-grade ethanol, sonicated at 25° C. for 1 hour using a sonicator UC-05 (Bath Type, 40 KHz) available from Jeotech, removed from ethanol, washed with ethanol, and then dried. The surface resistivity ($R_2$) of the CNTs thus treated was measured.

$$\text{Chemical Resistance Index (\%)} = \frac{R_0 - R_2}{R_0} \times 100 \quad \text{Equation 2}$$

wherein $R_0$ is the surface resistivity of the conductive material not treated, and $R_2$ is the surface resistivity of the conductive material after treatment including immersion in ethanol for 1 hour, removal from ethanol, washing with ethanol and then drying.

TABLE 1

| | Surface Resistivity ($R_0$) ($\Omega/\square$) | Surface Resistivity after Peeling ($R_1$) ($\Omega/\square$) | Peel Index (%) | Surface Resistivity after Chemical Treatment ($R_2$) ($\Omega/\square$) | Chemical Resistance Index (%) |
|---|---|---|---|---|---|
| Ex. 1 | $1.20 \times 10^3$ | ~$1.20 \times 10^3$ | ~0.0 | ~$1.20 \times 10^3$ | 0.0 |
| Ex. 2 | $7.80 \times 10^4$ | $7.74 \times 10^4$ | 0.8 | $7.70 \times 10^4$ | 1.2 |
| Ex. 3 | $6.50 \times 10^4$ | $6.43 \times 10^4$ | 1.1 | $6.40 \times 10^4$ | 1.5 |
| Ex. 4 | $4.70 \times 10^1$ | $4.66 \times 10^4$ | 0.8 | $4.61 \times 10^4$ | 1.8 |
| C. Ex. 1 | $5.20 \times 10^3$ | $3.56 \times 10^3$ | 31.5 | $4.54 \times 10^4$ | 12.7 |
| C. Ex. 2 | $2.50 \times 10^3$ | $2.49 \times 10^3$ | 0.6 | $1.81 \times 10^4$ | 27.6 |

As is apparent from results of property measurements, the polyimide film according to the present invention had a peel index of 30% or less, and thereby changes in surface resistivity were small before and after physical friction. Further, the polyimide film had a chemical resistance index of 10% or less, and thereby, changes in surface resistivity were small before and after solvent treatment.

Therefore, even when the conductive material is subjected to a mechanical force such as a frictional force or is treated with a chemical such as a solvent or the like, the surface resistivity thereof can be maintained, thus reliably maintaining superior electrical properties.

INDUSTRIAL APPLICABILITY

According to the present invention, a conductive material can be used for various photoelectrochemical devices including transparent electrodes.

The invention claimed is:

1. A conductive material comprising a polymer resin having an amine group (—$NH_2$) and carbon nanotubes having a carboxyl group (—COOH) chemically bonded thereto and having a peel index of 30% or less, as represented by Equation 1 below:

$$\text{Peel Index (\%)} = \frac{R_0 - R_1}{R_0} \times 100 \quad \text{Equation 1}$$

wherein $R_0$ is surface resistivity of a conductive material not treated, and $R_1$ is surface resistivity of a surface of the conductive material from which a tape is peeled off after having been adhered to the surface of the conductive material for 10 min.

2. The conductive material according to claim 1, wherein a chemical resistance index is 10% or less, as represented by Equation 2 below:

$$\text{Chemical Resistance Index (\%)} = \frac{R_0 - R_2}{R_0} \times 100 \qquad \text{Equation 2}$$

wherein $R_0$ is surface resistivity of the conductive material not treated, and $R_2$ is surface resistivity of the conductive material after treatment including immersion in ethanol for 1 hour, removal from ethanol, washing with ethanol and then drying.

3. The conductive material according to claim 1, wherein the carbon nanotubes having a carboxyl group (—COOH) are used in an amount of 0.001~2 wt % based on solid content of the polymer resin.

4. The conductive material according to claim 1, wherein the surface resistivity is $10^{-2}$~$10^{11}$Ω/□.

5. A method of manufacturing a conductive material, comprising:

applying a first dispersion including a first solvent and carbon nanotubes having a carboxyl group (—COOH) on a substrate layer;

removing the solvent from the applied first dispersion, thus forming a network layer of carbon nanotubes having a carboxyl group (—COOH);

applying a second dispersion including the first solvent and a resin having an amine group (—$NH_2$) on the network layer of carbon nanotubes having a carboxyl group (—COOH), so that the second dispersion infiltrates the network layer of carbon nanotubes having a carboxyl group (—COOH);

peeling off the substrate layer; and forming an amide bond between the resin having an amine group (—$NH_2$) and the carbon nanotubes having a carboxyl group (—COOH).

6. The method according to claim 5, wherein the forming the amide bond between the resin having an amine group (—$NH_2$) and the carbon nanotubes having a carboxyl group (—COOH) is performed by immersing a coating film obtained by peeling off the substrate layer in a coupling solution including a second solvent and an amide coupling agent.

7. The method according to claim 5, wherein the forming the amide bond between the resin having an amine group (—$NH_2$) and the carbon nanotubes having a carboxyl group (—COOH) is performed through heating in a temperature range of 40~400° C. at a heating rate of 1~10° C./min for 0.5 hours or longer.

8. The method according to claim 5, wherein the first solvent is one or a mixture of two or more selected from among alcohols, water, acetones, ethers, and toluenes.

9. The method according to claim 5, wherein the carbon nanotubes having a carboxyl group (—COOH) are prepared through acid treatment.

10. The method according to claim 6, wherein the second solvent is one or a mixture of two or more selected from among N-methyl-2-pyrrolidone (NMP), dimethylacetamide (DMAc), dimethylformamide (DMF), cyclohexanone, ethanol, methanol and chlorobenzene.

11. The method according to claim 6, wherein the amide coupling agent is a mixture of one or more selected from among 1,3-dicyclohexylcarbodiimide (DCC), 1-ethyl-3-(3-dimethylaminopropyl)carbodiimide.HCl and di-n-hexylcarbodiimide, and 1-hydroxybenzotriazole (HOBt).

* * * * *